United States Patent
Chen (10) Patent No.: US 7,345,451 B2
(45) Date of Patent: Mar. 18, 2008

(54) POWER SUPPLY DEVICE (75) Inventor: Sheng-Feng Chen, Taipei Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 332 days.

(21) Appl. No.: 11/136,006

(22) Filed: May 24, 2005

(65) Prior Publication Data

US 2006/0087289 A1    Apr. 27, 2006

(30) Foreign Application Priority Data

Oct. 22, 2004 (TW) .............................. 93132194 A
Mar. 15, 2005 (TW) .............................. 94107939 A (51) Int. Cl.
*H01M 10/46* (2006.01)
(52) U.S. Cl. ................................. 320/128
(58) Field of Classification Search ............... 320/131, 320/128, 134, 143, 137
See application file for complete search history.

(56) References Cited

U.S. PATENT DOCUMENTS

| | | | | |
|---|---|---|---|---|
| 4,242,627 A * | 12/1980 | Kisiel | ......................... | 320/143 |
| 5,355,072 A * | 10/1994 | Satsuma et al. | ............ | 320/131 |
| 5,861,730 A * | 1/1999 | Lee | ............................. | 320/106 |
| 5,982,146 A * | 11/1999 | Nguyen | ..................... | 320/131 |
| 6,104,168 A * | 8/2000 | Aranovich | .................. | 320/136 |
| 6,424,123 B1 * | 7/2002 | Odaohhara et al. | ......... | 320/134 |
| 7,034,506 B2 * | 4/2006 | Chen et al. | .................. | 320/136 |
| 7,161,410 B2 * | 1/2007 | Rademacher | ............... | 327/540 |
| 7,202,634 B2 * | 4/2007 | Bucur | ........................ | 320/137 |
| 2004/0189253 A1 * | 9/2004 | Tanabe et al. | .............. | 320/128 |
| 2004/0217737 A1 * | 11/2004 | Popescu | ..................... | 320/128 |
| 2004/0257041 A1 * | 12/2004 | Nagaoka | ..................... | 320/128 |
| 2005/0253556 A1 * | 11/2005 | Kuiri | .......................... | 320/128 |
| 2006/0033472 A1 * | 2/2006 | Wang | ......................... | 320/128 |

* cited by examiner

*Primary Examiner*—Edward H Tso
(74) *Attorney, Agent, or Firm*—Thomas, Kayden, Horstemeyer & Risley (57) ABSTRACT

A power supply device providing required power to a loading device. The power supply device includes a battery, an adjustable power converter and a control circuit. The battery, having a current meter, selectively outputs required power to the loading device. The power converter receives and converts an AC voltage into a first DC voltage or a second DC voltage, further receives an adjusting signal. The power converter outputs the second DC voltage when the adjusting signal is enabled. The magnitude of the second DC voltage is lower than the output voltage of the battery. The control circuit is coupled to the battery and the power converter. When the power of the battery is gauged, the control circuit enables the adjusting signal for the power converter to output the second DC voltage, so that the battery discharges the loading device for the current meter to re-gauge the power of the battery.

8 Claims, 5 Drawing Sheets

POWER SUPPLY DEVICE

This application claims the benefit of Taiwan applications, Ser. No. 93132194, filed Oct. 22, 2004, and Ser. No. 94107939, filed Mar. 15, 2005, the subject matter of which is incorporated herein by reference.

BACKGROUND OF THE INVENTION

1. Field of the Invention

The invention relates in general to a power supply device, and more particularly to a battery power supply device with self-learning procedure.

2. Description of the Related Art

Figure 1:
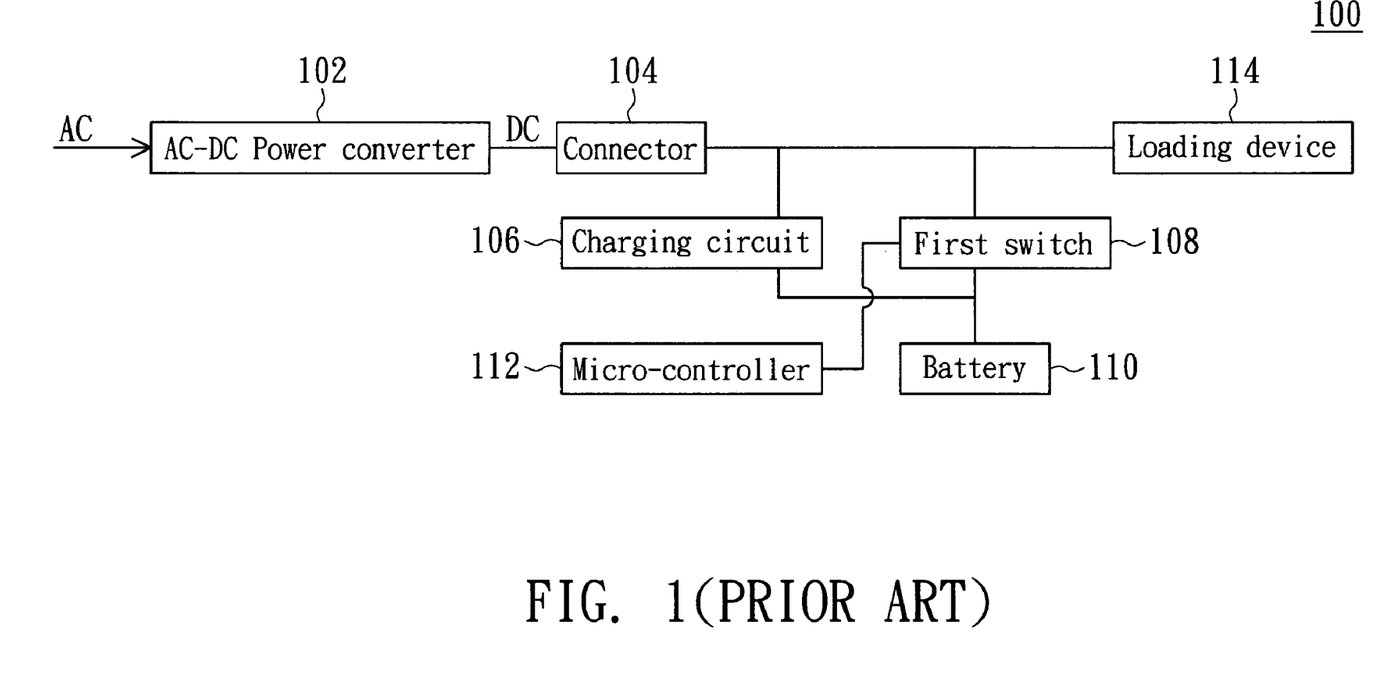
FIG. 1 is a block diagram of a first conventional power supply device.

Referring to FIG. 1, a block diagram of a first conventional power supply device is shown. A power supply device 100 includes an AC-DC power converter 102, a connector 104, a charging circuit 106, a first switch 108, a battery module 110, a micro-controller 112 and a loading device 114. The power supply device 100 provides required power to the loading device 114, and the loading device 114 can be a notebook computer for instance. The AC-DC power converter 102 receives and converts an alternating power AC to a direct current power DC. The alternating current power AC can be an electric supply of AC110/220V for instance. The direct current power DC provides required power to the notebook computer 114 via the connector 104, or by way of using the charging circuit 106 to charge the battery 110. Meanwhile, the battery does not provide any power to the notebook computer 114 during charging. When the alternating current power AC is not received by the AC-DC power converter 102, the first switch 108 is switched on by the micro-controller switches, so that the output voltage of the battery is provided to the notebook computer 114 via the first switch 108.

The battery 110 has a current gauge IC (not shown in FIG. 1), which gauges the current flowing into and from the battery 110 to measure the power of the battery 110. After being charged and discharged repeatedly, memory effect would occur to the battery 110, so that the power storage of the battery 110 becomes lower and lower. Consequently, after a long duration of usage, the battery 110 must execute a self-learning procedure for the storage of the power of the battery 110 to be gauged precisely. According to the procedure, the battery 110 is first fully charged and then fully discharged. When the battery 110 is being discharged, the current flowing into and from the battery 110 is gauged by the current gauge IC to gauge the magnitude of the power currently stored in the battery 110. For the battery 110 to be "fully discharged", the voltage of the battery 110 has to be discharged to be lower than an end voltage, which is a voltage value defined by the manufacturer of the current gauge IC. When the voltage of the battery 110 gauged by the gauge IC is lower than the end voltage, the battery 110 is determined to be low-battery. Therefore, if using the self-learning procedure of the battery, the user must fully discharge the battery 110, so that the current gauge IC is still able to precisely gauge the storage of the power of the battery 110 after a long duration of usage.

When the self-learning procedure of the battery needs to be executed, the power supply device 100 uses the charging circuit 106 to fully charge the battery 110, then fully discharge the battery 110. However, when the battery is discharged, the conventional direct current power DC is outputted to the notebook computer 114 continuously because the AC-DC power converter 102 cannot be switched off automatically. Therefore, the power supply device 100 would request the user to unplug to cut off the electrical connection between the AC-DC power converter 102 and the electric supply for the battery 110 to discharge to the notebook computer 114. For example, when the power supply device 100 is used in the notebook computer 114, the program uses a message window to inform the user to unplug the AC-DC power converter 102 from the electric supply. Next, the micro-controller 112 controls the first switch 108 to be switched on for the battery 110 to discharge to the notebook computer 114 via the first switch 108 until the voltage of the battery 110 is fully discharged, that is, below the end voltage. However, this practice requires manual operation, thus causing inconvenience and burden to the user.

Figure 2:
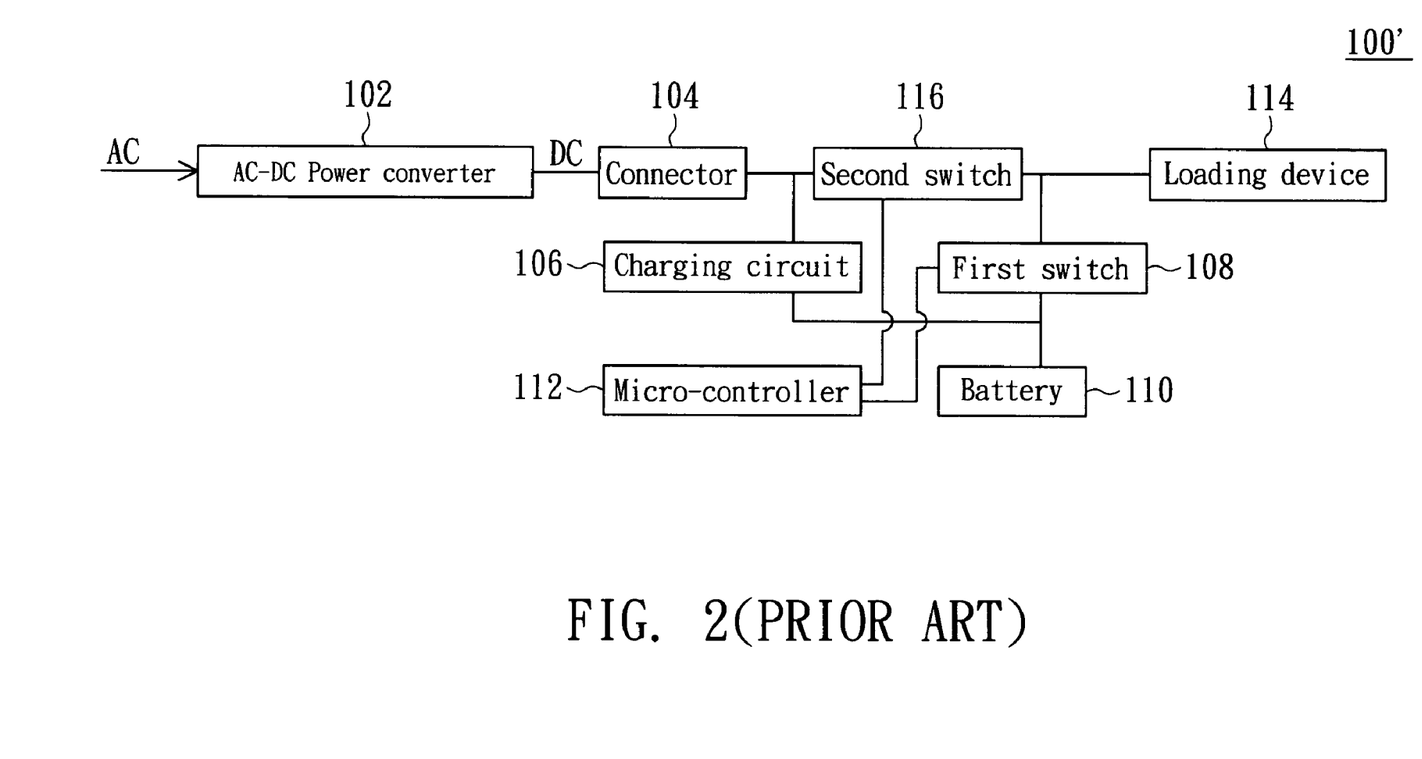
FIG. 2 is a block diagram of a second conventional power supply device.

Referring to FIG. 2, a block diagram of a second conventional power supply device is shown. A second switch 116 is added to the power supply device 100'. The second switch 116 is coupled to between the AC-DC power converter 102 and the notebook computer 114. The micro-controller 112 is used to control and switch off the second switch 116 for the second switch 116 to be disconnected from the direct current power DC provided by the AC-DC power converter 102. So, the battery 110 can discharge to the notebook computer via the first switch 108 automatically without bothering the user to unplug the AC-DC power converter 102 from the electric supply. However, this would cause the direct current power DC provided by the AC-DC power converter 102 to be completely isolated. Accordingly, when the user unplugs the battery 110, the power of the notebook computer 114 being cut off abruptly may cause data loss to the computer. This practice not only incurs extra costs regarding the installation of the second switch 116, but also brings about extra risk of data loss.

SUMMARY OF THE INVENTION

It is therefore an object of the invention to provide a power supply device to resolve the problem arising above when fully discharge the battery in the self-learning procedure.

According to the object of the invention, a power supply device providing required power to a loading device is provided. The power supply device includes a battery, an adjustable power converter and a control circuit. The battery has a current meter for gauging the current flowing into and from the battery, and selectively outputs required power to the loading device. The power converter receives and converts an AC voltage into a first DC voltage or a second DC voltage, further receives an adjusting signal. The power converter outputs the second DC voltage when the adjusting signal is enabled. The magnitude of the second DC voltage is lower than the output voltage of the battery. The control circuit is coupled to the battery and the power converter. When the power of the battery is gauged, the control circuit enables the adjusting signal for the power converter to output the second DC voltage, so that the battery discharges the loading device for the current meter to re-gauge the power of the battery.

According to another object of the invention, a power supply device providing required power to a loading device is provided. The power supply device includes a battery, an adjustable power converter and a control circuit. The battery has a current meter for gauging the current flowing into and from the battery, and selectively outputs required power to the loading device. The current meter output a power indicating signal according to the magnitude of the power of the battery.

The adjustable power converter receives and converts an AC voltage into a first DC voltage or a second DC voltage. The adjustable power converter further receives an adjusting signal. When adjusting signal is enabled, the adjustable power converter outputs a second DC voltage. The adjustable power converter includes a converter main circuit, a first impedance, a second impedance, a third impedance, a first transistor and a fourth impedance.

The converter main circuit has a voltage output end and a voltage feedback end. The converter main circuit converts an AC voltage into a first DC voltage or a second DC voltage to be outputted at a voltage output end. One end of the first impedance is coupled to the voltage output end, while another end of the first impedance is coupled to the voltage feedback end. One end of the second impedance is coupled to the voltage feedback end to output a feedback voltage to the voltage feedback end. Another end of the second impedance is coupled to a fixed voltage. The third impedance is connected in parallel with the first impedance when the adjusting signal is enabled. The first transistor has a first emitter, a first base and a first collector. The first collector is coupled to the voltage feedback end. The first base receives the adjusting signal. One end of the third impedance is coupled to the voltage output end, while another end of the third impedance is coupled to the first emitter. One end of the fourth impedance is coupled to the voltage output end, while another end of the fourth impedance is coupled to the first base.

The control circuit is coupled to the battery and the adjustable power converter. When the magnitude of power of the battery is gauged, the control circuit enables the adjusting signal for the first transistor to be switched on. After the first transistor is switched on, the third impedance is connected in parallel with the second impedance, and the voltage output end outputs a second DC voltage. Meanwhile, the control circuit controls the battery to discharge to the loading device, so that the current meter can re-gauge the magnitude of the power of the battery.

The adjustable power converter adjusts the voltage of the voltage output end according to the magnitude of the feedback voltage. When the adjusting signal is enabled, the third impedance is connected in parallel with the second impedance, and the voltage output end outputs the second DC voltage, otherwise the voltage output end outputs the first DC voltage.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 3:
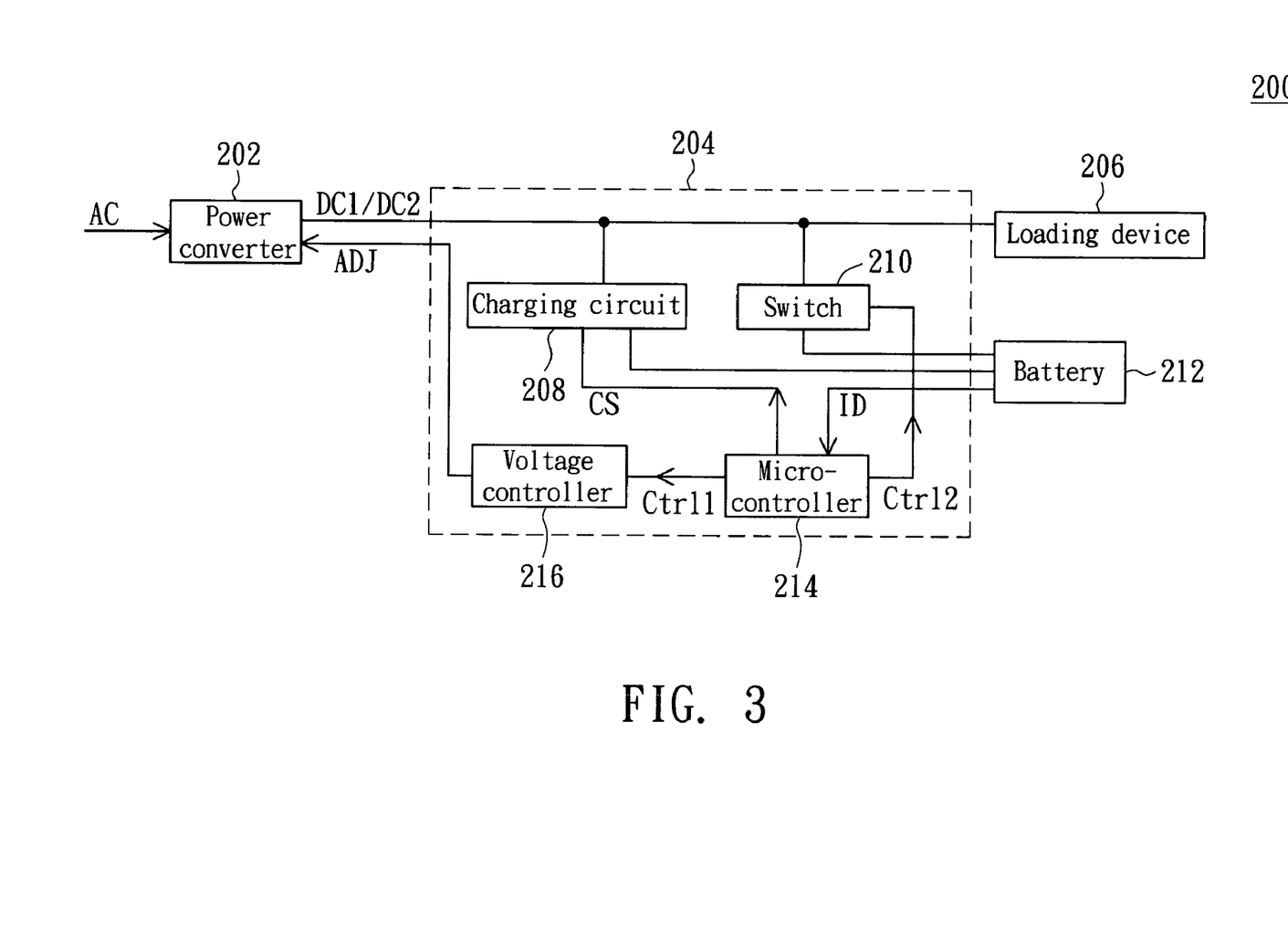
FIG. 3 is a block diagram of a power supply device according to a preferred embodiment of the invention.

Referring to FIG. 3, a block diagram of a power supply device according to a preferred embodiment of the invention is shown. A power supply device 200 includes an adjustable power converter 202, a control circuit 204, a battery 212 and a loading device 206. The loading device 206 can be a notebook computer for instance. The power supply device 200 provides required power to the loading device 206 such as notebook computer. The adjustable power converter 202 receives and converts an alternating current voltage AC into a first direct current voltage DC1 or a second direct current voltage DC2. The alternating current power AC can be an electric supply of AC110/220V for example. The adjustable power converter 202 further receives an adjusting signal ADJ and outputs the second direct current voltage DC2 when the adjusting signal ADJ is enabled, otherwise the adjustable power converter 202 outputs the first direct current voltage DC1. The control circuit 204 includes a switch 210, a charging circuit 208, a voltage controller 216 and a micro-controller 214. The battery 212 includes a current meter (not shown in FIG. 3) for measuring the current flowing into and from the battery 212 to gauge the power of the battery 212 and output a power indicating signal ID to the micro-controller 214 according to the magnitude of the power of the battery 212. The micro-controller 214 outputs a control signal Ctrl1, a switch signal Ctrl2 and a charging signal CS. The charging circuit 208, which is coupled to the power converter 202, charges the battery 212 when the charging signal CS outputted from the micro-controller 214 is received by the charging circuit 208. The voltage controller 216 outputs the adjusting signal ADJ according to the control signal Ctrl1. The switch 210, which is coupled to between the battery 212 and the notebook computer 206, is switched on according to the switch signal Ctrl2.

Under normal operating circumstances, when receiving the alternating current voltage AC, the power supply device 200 directly provides the first direct current voltage DC1 to the notebook computer 206, but the battery 212 does not provide required power to the notebook computer 206. Or, when a power indicating signal ID indicates that the battery 212 is low-battery, the micro-controller 214 outputs a charging signal CS, and the charging circuit 208 charges the battery 212 according to the charging signal CS.

Another circumstance is that when the power converter 202 is unplugged from the electric supply 200 or when the power provided by the power converter 202 cannot be received by the control circuit of the loading device 206, the micro-controller 214 outputs a switch signal Ctrl2 for the switch 210 to be switched on. When the switch 210 is switched on, the battery 212 is able to provide required power to the notebook computer 206.

When the self-learning procedure of the battery is executed, the battery 212 is fully charged and then fully discharged. The micro-controller 214 outputs the charging signal CS for the charging circuit 208 to charge the battery 212. The battery 212 is fully charged until the power indicating signal ID indicates the power of the battery 212 is full, and then the battery 212 is fully discharged. The power converter 202 still provides the first direct current power DC1 to the notebook computer 206. For the battery 212 to be able to discharge to the notebook computer 206, the output voltage of the power converter 202 must be lower than an end voltage, so that the battery 212 can discharge to the notebook computer 206. Then the micro-controller 214 outputs the control signal Ctrl1 and the switch signal Ctrl2. The adjusting signal ADJ is enabled by the voltage controller 216 according to the control signal Ctrl1. When the adjusting signal ADJ received by the power converter 202 is enabled, the power converter 202 shifts to output the second direct current voltage DC2, and the switch 210 is switched on according to the switch signal Ctrl2. The output voltage of the battery 212 is higher than the second direct current voltage DC2, so that the power supply device 200 does not provide the second direct current voltage DC2 to the loading device 206, and that the control circuit 204 only controls the battery 212 to discharge to the loading device 206. Meanwhile, the battery 212 continues to discharge to the loading device 206 until the power indicating signal ID indicates that the battery 212 is low-battery; the current meter stops gauging and starts to re-gauge the power of the battery 212. Therefore, the user does not need to cut off the electrical connection between the power converter 202 and the electric supply in order to discharge the battery.

Figure 4:
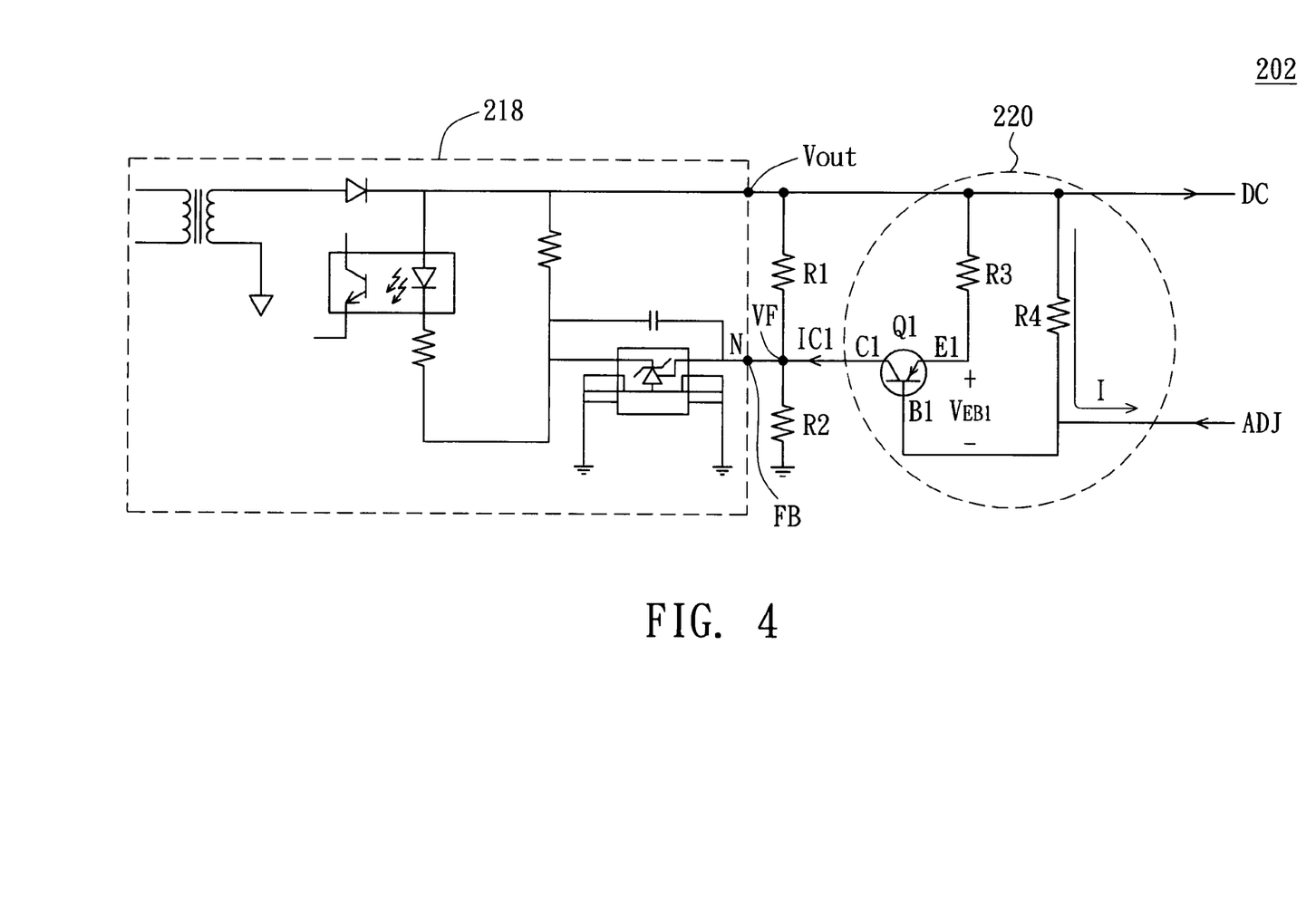
FIG. 4 is a circuit diagram of a part of a power converter.

Furthermore, the spirit of the invention lies in controlling the output voltage of the adjustable power converter 202 to be lower than the end voltage of the battery 212, that is, for the second direct current voltage DC2 to be lower than the end voltage. Referring to FIG. 4, a circuit diagram of a part of a power converter is shown. The power converter 202 includes a converter main circuit 218, a first impedance R1, a second impedance R2 and an adjusting circuit 220. The two impedances R1 and R2 can respectively be a resistance for instance. The converter main circuit 218 has a voltage output end Vout and a voltage feedback end FB. The converter main circuit 218 converts an alternating current voltage AC (not shown in FIG. 4) into a direct current voltage DC1 or DC2 to be outputted at the voltage output end Vout. One end of the first impedance R1 is coupled to the voltage output end Vout, while another end of the first impedance R1 is coupled to the voltage feedback end FB. One end of the second impedance R2 is coupled to the voltage feedback end FB to output a feedback voltage VF to the voltage feedback end FB, while another end of the second impedance R2 is coupled to a fixed voltage. The fixed voltage can be a grounding voltage for instance. When the first direct current voltage DC1 generates the feedback voltage VF at a node N via a voltage-dividing circuit composed of the two impedances R1 and R2, the converter main circuit 218 compares the feedback voltage VF with the internal reference voltage (not shown) to control the magnitude of the first direct current voltage DC1. When the feedback voltage VF changes, the converter main circuit 218 would adjust its output voltage outputted at the voltage output end Vout for the feedback voltage VF to be maintained at a constant value. Therefore, the output voltage of the converter main circuit 218 can be adjusted by adjusting the magnitude of the feedback voltage VF.

The power converter 202 has an adjusting circuit 220, which changes the magnitude of the feedback voltage VF when the adjusting signal ADJ is enabled for the power converter 202 to output the second direct current voltage DC2. The second direct current voltage DC2 is defined to be lower than an end voltage, which is defined by the manufacturer of the current gauge IC. The output voltage of the battery 212 being lower than end voltage denotes that the battery is low-battery and that the battery is fully discharged.

The adjusting circuit 220 includes a first transistor Q1, a third impedance R3 and a fourth impedance R4. The two impedances R3 and R4 can respectively be a resistance for instance. The first transistor Q1, which includes a first emitter E1, a first base B1 and a first collector C1, can be a PNP-type bi-polar junction transistor (BJT). The first collector C1 is coupled to the voltage feedback end FB. The first base B1 receives the adjusting signal ADJ. One end of the third impedance R3 is coupled to the voltage output end Vout, while another end of the third impedance R3 is coupled to the first emitter E1. One end of the fourth impedance is coupled to the voltage output end Vout, while another end of the fourth impedance is coupled to the first base B1. When the adjusting signal ADJ is enabled, the first transistor Q1 is switched on, the third impedance R3 and first impedance R1 are connected in parallel for the direct current voltage DC1 to generate the feedback voltage VF via a voltage-dividing circuit. The voltage-dividing circuit includes the two impedances R1 and R3 which are connected in parallel, and an impedance R2. Since the equivalent resistance of the impedances R1 and R3 is a resistance smaller than the impedance R1, the output voltage of the converter main circuit 218 is reduced to the second direct current voltage DC2 for the feedback voltage VF to be maintained at a constant value.

Figure 5:
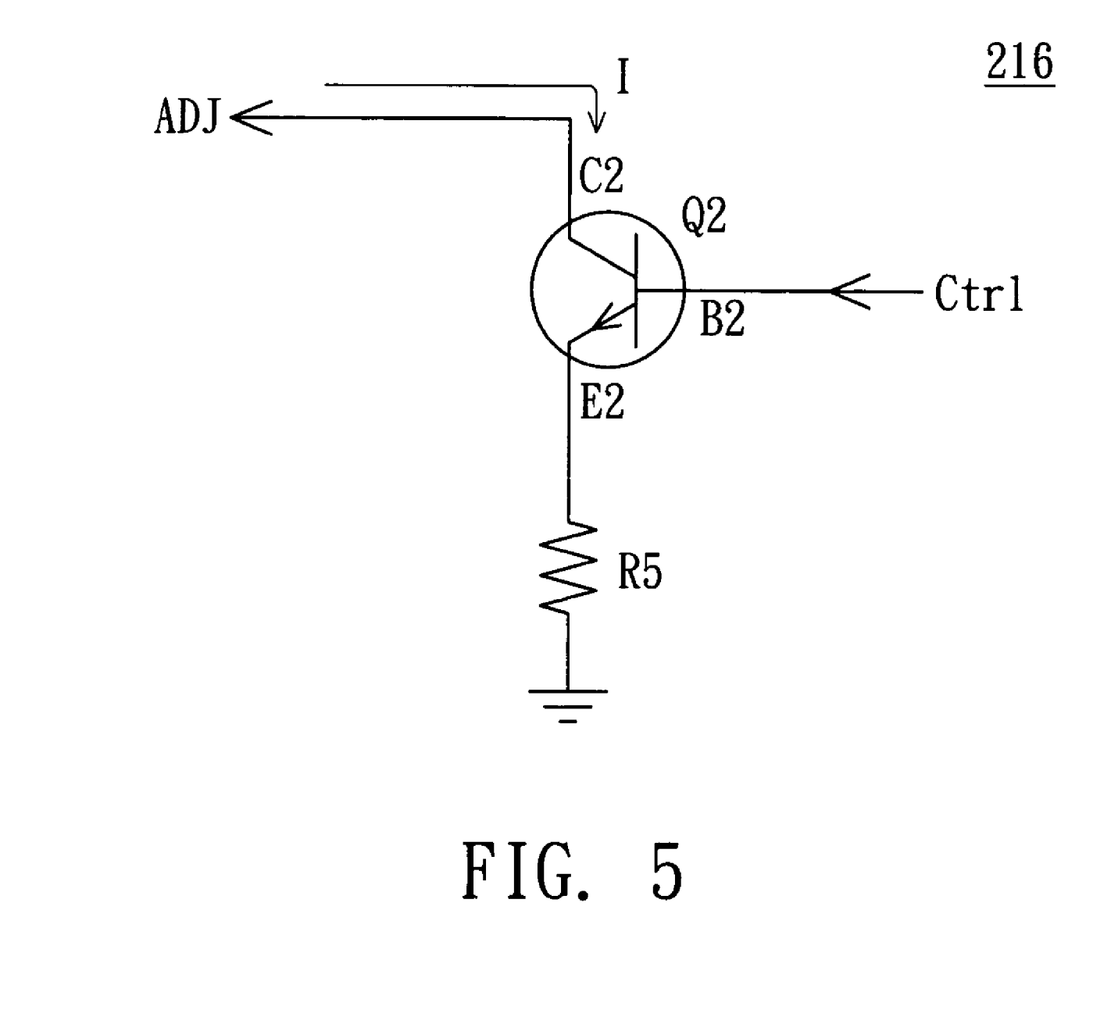
FIG. 5 is a circuit diagram of a voltage controller of FIG. 3.

Referring to FIG. 5, a circuit diagram of a voltage controller 216 of FIG. 3 is shown. The voltage controller 216, which outputs the adjusting signal ADJ according to the control signal Ctrl1, includes a second transistor Q2 and a fifth impedance R5. The second transistor Q2, which can be a NPN-type bi-polar junction transistor (BJT), includes a second emitter E2, a second base B2 and a second collector C2. The second collector C2 outputs the adjusting signal ADJ. The second base B2 receives the control signal Ctrl1. One end of the fifth impedance R5 is coupled to second emitter E2, while another end of the fifth impedance is coupled to the grounding voltage. When the voltage of the control signal Ctrl1 outputted by the micro-controller 214 is a high level voltage such as 3.3V for instance, the second transistor Q2 is switched on, and a current I would flow through the second transistor Q2. That is, the current I of the adjusting signal ADJ outputted by the second collector C2 equals $(3.3-V_{BE2})/R7=2.5$ mA.

When the current I of the adjusting signal ADJ equals 2.5 mA, the first transistor Q1 is switched on for the power converter 202 to output the second direct current voltage DC2. Refer to both FIG. 4 and FIG. 5. Two conditions arise when the feedback voltage VF is 2.5V, the end voltage is 9V, the first impedance R1 is 61.9K ohm, the second impedance R2 is 10K ohm, the third impedance R3 is 21.5K ohm and the fourth impedance R4 is 1.5K ohm are disclosed below.

First condition: Suppose the adjusting signal ADJ is disabled, the current I is 0 mA, the collector current IC1 of the first transistor Q1 is approximately equal to $(0\ mA \times R4 - V_{EB1})/R3 = (0\ mA \times 1.5K\Omega - 0.6V)/21\ K\Omega = -27.6\ \mu A$, wherein the $V_{EB1}$ is the voltage difference between the first emitter E1 and the first base B1 of the first transistor Q1. The collector current IC1 being negative denotes that the first transistor Q1 is not switched on, and meanwhile, the voltage of the first direct current voltage DC1 outputted at the voltage output end Vout is approximately equal to $(VF/R2-IC1) \times R1+VF=(2.5V/10K\Omega-0) \times 61.9K+2.5V=18V$.

Second condition: When the adjusting signal ADJ is enabled, the current I is increased to 2.5 mA, and IC1 is approximately equal to $(2.5\ mA \times 1.5K\Omega - 0.6V)/21K\Omega = 0.145$ mA. Meanwhile, the voltage of the second direct current voltage DC2 outputted at the voltage output end Vout is approximately equal to $(VF/R2-IC1) \times R1+VF=(2.5V/10K\Omega - 0.145\ mA) \times 61.9K+2.5V=9V$, which is approximately equal to the end voltage of battery. Therefore, when the voltage received by the second base B2 is equal to 0V, that is when the control signal Ctrl1 is disabled, the output voltage of the power converter 202 is equal to the first direct current voltage DC1 which is 18V. When the voltage received by the second base B2 is equal to 3.3V, that is when the control signal Ctrl1 is enabled, the output voltage of the power converter 202 is equal to the second direct current voltage DC2 which is 9V.

Moreover, when the battery 212 is out of order during the process of discharging, the power converter 202 is powered by the second direct current voltage DC2 so as to continue to provide required power to notebook computer 206.

The power supply device disclosed in above embodiment of the invention adjusts the output voltage of the power converter to be lower than the end voltage of the battery, so that the battery discharges the notebook computer for the output voltage of the battery to be discharged until below the level of the end voltage. Consequently, the battery is fully discharged as required by the self-learning procedure, and when the battery is out of order during the process of discharging, the power converter can provide power to prevent data loss inside the computer.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power supply device providing required power to a loading device, the power supply device comprises:
    a battery used to selectively output required power to the loading device, wherein the battery has a current meter for measuring the current flowing into and from the battery to gauge the power of the battery;
    an adjustable power converter used to receive and convert an alternating current (AC) voltage into a first direct current (DC) voltage or a second DC voltage outputted to the loading device, wherein the adjustable power converter further receives an adjusting signal then outputs the second DC voltage when the adjusting signal is enabled, the magnitude of the second DC voltage is lower than an end voltage of the battery; and
    a control circuit coupled to the battery and the adjustable power converter, wherein when the power of the battery is gauged, the adjusting signal is enabled by the control circuit for the adjustable power converter to output the second DC voltage, and the control circuit controls the battery to discharge to the loading device for the current meter to re-gauge the power of the battery.

2. The power supply device according to claim 1, wherein the current meter output a power indicating signal according to the power of the battery, the control circuit comprises:
    a micro-controller, which outputs a charging signal when the power indicating signal indicates the battery is low-battery; and
    a charging circuit coupled to the adjustable power converter, wherein the charging circuit charges the battery when receiving the charging signal.

3. The power supply device according to claim 2, wherein the adjustable power converter comprises:
    a converter main circuit comprising a voltage output end and a voltage feedback end, wherein the converter main circuit converts the AC voltage into the first DC voltage or the second DC voltage and outputs the first DC voltage or the second DC voltage at the voltage output end;
    a first impedance, wherein one end of the first impedance is coupled to the voltage output end, while another end of the first impedance is coupled to the voltage feedback end;
    a second impedance, wherein one end of the second impedance is coupled to the voltage feedback end to output a feedback voltage to the voltage feedback end, while another end of the second impedance is coupled to a fixed voltage; and
    a third impedance, wherein the third impedance and the first impedance are connected in parallel when the adjusting signal is enabled;
    wherein, the adjustable power converter adjusts the voltage of the voltage output end according to the magnitude of the feedback voltage, when the adjusting signal is enabled, the third impedance and the second impedance are connected in parallel, and the voltage output end outputs the second DC voltage, otherwise the voltage output end outputs the first DC voltage.

4. The power supply device according to claim 3, wherein the adjustable power converter further comprises:
    a first transistor comprising a first emitter, a first base and a first collector, wherein the first collector is coupled to the voltage feedback end, the first base receives the adjusting signal, one end of the third impedance is coupled to the voltage output end, while another end of the third impedance is coupled to the first emitter; and
    a fourth impedance, wherein one end of the fourth impedance is coupled to the voltage output end, while another end of the fourth impedance is coupled to the first base.

5. The power supply device according to claim 4, wherein the control circuit comprises:
    a second transistor comprising a second emitter, a second base and a second collector , wherein the second collector outputs the adjusting signal, while the second base receives a control signal; and
    a fifth impedance, wherein one end of the fifth impedance is coupled to the second emitter, while another end of the fifth impedance is coupled to the fixed voltage;
    wherein, when the control signal is enabled, the second transistor is switched on, a first current flows through the fourth impedance, the second transistor and the fifth impedance to enable the adjusting signal, so that the first transistor is switched on and that the third impedance and the first impedance are substantially connected in parallel.

6. A power supply device providing required power to a loading device, wherein the power supply device comprises:
    a battery used to selectively output required power to the loading device, wherein the battery has a current meter for measuring the current flowing into and from the battery to gauge the power of the battery, the current meter outputs a power indicating signal according to the power of the battery;
    an adjustable power converter, which receives and converts an AC voltage into a first DC voltage or a second DC voltage outputted to the loading device, wherein the second DC voltage is lower than an end voltage of the battery, the adjustable power converter further receives an adjusting signal then outputs the second DC voltage when the adjusting signal is enabled, the adjustable power converter comprises:
        a converter main circuit comprising a voltage output end and a voltage feedback end, wherein the converter main circuit converts the AC voltage into a first DC voltage or the second DC voltage to be outputted at the voltage output end;

a first impedance, wherein one end of the first impedance is coupled to the voltage output end, while another end of the first impedance is coupled to the voltage feedback end;

a second impedance, while one end of the second impedance is coupled to the voltage feedback end to output a feedback voltage to the voltage feedback end, while another end of the second impedance is coupled to a fixed voltage;

a third impedance, wherein the third impedance and the first impedance are connected in parallel when the adjusting signal is enabled;

a first transistor comprising a first emitter, a first base and a first collector, wherein the first collector is coupled to the voltage feedback end, the first base receives the adjusting signal, one end of the third impedance is coupled to the voltage output end, while another end of the third impedance is coupled to the first emitter; and a fourth impedance, wherein one end of the fourth impedance is coupled to the voltage output end, while another end of the fourth impedance is coupled to the first base; and a control circuit coupled to the battery and the adjustable power converter, wherein when the power of the battery is gauged, the adjusting signal is enabled by the control circuit for the first transistor to be switched on, then the third impedance and the second impedance are connected in parallel, the voltage output end outputs the second DC voltage, so that the control circuit controls the battery to discharge to the loading device for the current meter to re-gauge the power of the battery;

wherein, the adjustable power converter adjusts the voltage of the voltage output end according to the magnitude of the feedback voltage, when the adjusting signal is enabled, the third impedance and the second impedance are connected in parallel, and the voltage output end outputs the second DC voltage, otherwise the voltage output end outputs the first DC voltage.

7. The power supply device according to claim 6, wherein the current meter outputs a power indicating signal according to the power of the battery, the control circuit comprises:

a micro-controller, which outputs a charging signal when the power indicating signal indicates that the battery is low-battery; and a charging circuit coupled to the adjustable power converter, wherein the charging circuit charges the battery when receiving the charging signal.

8. The power supply device according to claim 6, wherein the control circuit comprises:

a second transistor comprising a second emitter, a second base and a second collector, wherein the second collector outputs the adjusting signal, while the second base receives a control signal; and a fifth impedance, wherein one end of the fifth impedance is coupled to the second emitter, while another end of the fifth impedance is coupled to the fixed voltage;

wherein, when the control signal is enabled, the second transistor is switched on, a first current flows through the fourth impedance, the second transistor and the fifth impedance to enable the adjusting signal, so that the first transistor is switched on and that the third impedance and the first impedance are substantially connected in parallel.

* * * * *